United States Patent [19]

Yu

[11] Patent Number: 5,716,117
[45] Date of Patent: Feb. 10, 1998

[54] STORAGE BOX ADAPTED TO BE ASSEMBLED EASILY FOR STORING SUBSTANTIALLY FLAT ARTICLES THEREIN

[75] Inventor: Jackson Yu, Taipei, Taiwan

[73] Assignee: Ying Sun, Shanghai, China

[21] Appl. No.: 661,113

[22] Filed: Jun. 10, 1996

[51] Int. Cl.⁶ .................................. A47B 81/06
[52] U.S. Cl. ................ 312/351; 312/138.1; 312/293.1;
312/9.48; 206/308.1
[58] Field of Search .................. 312/351, 293.1,
312/9.9, 9.48, 319.1, 9.63, 138.1; 206/387.15,
308.1, 449; 211/40, 41; D6/26, 27, 28,
29, 30; 220/524, 528, 529

[56] References Cited

U.S. PATENT DOCUMENTS

| | | | |
|---|---|---|---|
| 2,092,196 | 9/1937 | Wood | 312/138.1 X |
| 2,227,854 | 1/1941 | Walters | 312/138.1 X |
| 3,314,741 | 4/1967 | Litner | 312/351 |
| 4,217,012 | 8/1980 | Klaus | 312/293.1 X |
| 4,650,072 | 3/1987 | Ackeret | 206/308.1 |
| 4,723,820 | 2/1988 | Kroneck | 312/138.1 |
| 4,819,801 | 4/1989 | Howard | 211/40 X |
| 5,183,177 | 2/1993 | Yu | 206/308.1 X |
| 5,199,777 | 4/1993 | Taima et al. | 312/319.1 |
| 5,246,284 | 9/1993 | Merzon | 312/107 |
| 5,320,244 | 6/1994 | Yu | 206/308.1 X |
| 5,393,135 | 2/1995 | Tisbo et al. | 312/9.48 |
| 5,405,196 | 4/1995 | Shoup et al. | 312/351 |
| 5,427,446 | 6/1995 | Glomski | 312/351 X |

FOREIGN PATENT DOCUMENTS

| | | | |
|---|---|---|---|
| 978447 | 11/1975 | Canada | 312/351 |
| 494407 | 7/1992 | European Pat. Off. | 206/308.1 |
| 2665062 | 1/1992 | France | 312/330.1 |

*Primary Examiner*—Peter M. Cuomo
*Assistant Examiner*—Hanh V. Tran
*Attorney, Agent, or Firm*—Oblon, Spivak, McClelland, Maier & Neustadt, P.C.

[57] ABSTRACT

A storage box includes a casing and a one-piece frame unit. The casing includes a pair of first upright lateral inner walls opposite to each other, and a substantially flat bottom wall transversely interposed therebetween to define a front open chamber with the inner walls. The frame unit includes a pair of second upright lateral inner walls each having an inner surface and an outer surface defining therebetween a width slightly larger than that of the first inner walls so as to be press fitted in the chamber. A flange portion is formed on a front edge of each of the second upright lateral outer surfaces for abutting against a front edge of each of the first upright lateral inner walls so as to prevent further movement of the frame unit when the frame unit is press fitted into the chamber. A plurality of first parallel ribs are transversely formed on each of the second upright inner surfaces so as to define a plurality of flat article receiving slots in the chamber. The lengths of each of the second inner surfaces as well as each of the first parallel ribs are shorter than one half of a length in a transverse direction of each of the first upright inner walls.

6 Claims, 5 Drawing Sheets

STORAGE BOX ADAPTED TO BE ASSEMBLED EASILY FOR STORING SUBSTANTIALLY FLAT ARTICLES THEREIN

BACKGROUND OF THE INVENTION

1. Field of the Invention

The invention relates to a storage box, more particularly to a storage box for storing substantially flat articles, like compact discs, therein.

2. Description of the Related Art

Referring to FIGS. 1 and 2, a conventional storage box for storing substantially flat articles is shown to include a rectangular outer casing 1, a rectangular inner casing 2, and a rectangular frame unit 3. The outer casing 1 is formed with a frontward extension 10. The inner casing 2 is disposed inside the outer casing 1 and includes a vertical rear wall 21, a horizontal upper wall 23, a horizontal bottom wall 24, two opposite vertical side walls 20, and a partition wall 22 formed between the side walls 20 so as to define two compartments on two sides of the partition wall 22. Each of the side walls 20 and the partition wall 22 is formed with a plurality of ribs 200 which define a plurality of flat article receiving slots in each of the compartments accessible from the front portion thereof. The side walls 20 cooperatively define an inverted L-shaped door sliding groove for accommodation of a vertically movable flexible door panel 25 therein. The frame unit 3 has a peripheral groove 30 press fitted by the frontward extension 10 of the outer casing 1 such that the frame unit 3 prevents disengagement of the inner casing 2 from the outer casing 1.

Note that the conventional storage box includes several parts and therefore requires several steps to assemble the same. For example, the inner casing 2 needs to be assembled before being disposed in the outer casing 1. During assembly, if the side walls 20 and the partition wall 22 of the inner casing 2 are not carefully arranged and precisely measured, misalignment of the ribs 200 between the side walls 20 and the partition wall 22 may occur, thereby resulting in the formation of inclined receiving slots.

SUMMARY OF THE INVENTION

The object of this invention is to provide a storage box which includes a relatively small number of components so as to facilitate assembly thereof.

Another object of this invention is to provide a storage box which has flat article receiving slots that are defined by a plurality of aligned ribs.

Accordingly, the storage box for storing substantially flat articles in accordance with this invention includes a casing and a one-piece frame unit. The casing includes a pair of first upright lateral inner walls opposite to each other, and a substantially flat bottom wall transversely interposed therebetween to define a front open chamber cooperatively with the inner walls. The frame unit includes a pair of second upright lateral inner surfaces, and a pair of second upright lateral outer surfaces which define therebetween a width slightly larger than that of the first inner walls so as to be press fitted in the chamber. A flange portion is formed on a front edge of each of the second upright lateral outer surfaces for abutting against a front edge of each of the first upright lateral inner walls so as to prevent further movement of the frame unit when the frame unit is press fitted into the chamber. A plurality of first parallel ribs are transversely formed on each of the second upright lateral inner surfaces so as to define a plurality of flat article receiving slots in the chamber. The lengths of each of the second inner surfaces, as well as each of the first parallel ribs, are shorter than one half of a length in a transverse direction of each of the first upright inner walls.

Because the frame unit is separately formed and can be press fitted to the chamber, attachment of the frame unit is thus facilitated.

BRIEF DESCRIPTION OF THE DRAWINGS

Other features and advantages of this invention will become more apparent in the following detailed description of the preferred embodiment with reference to the accompanying drawings, in which.

DESCRIPTION OF THE PREFERRED EMBODIMENTS

Figure 1:
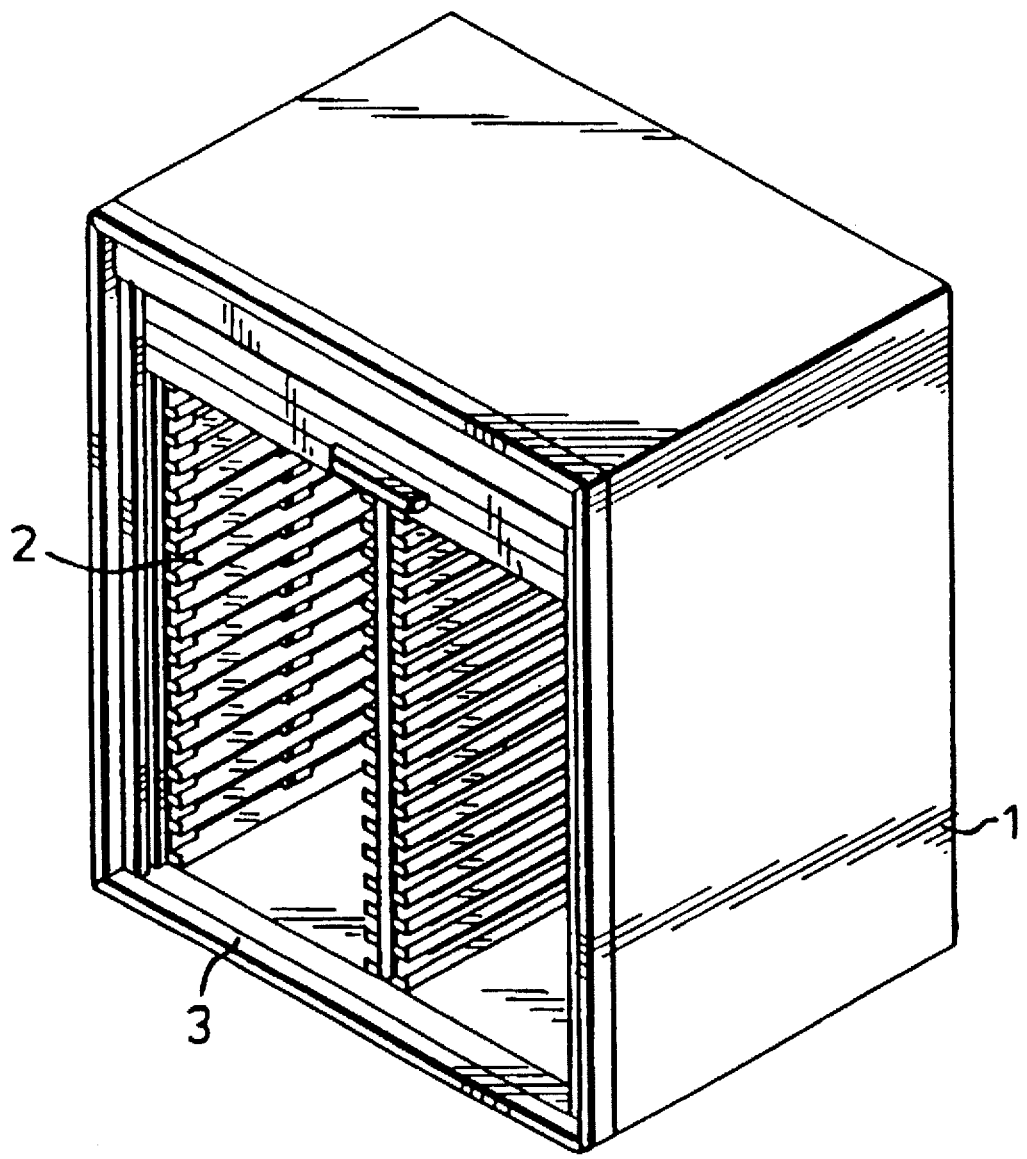
FIG. 1 is a perspective view of a conventional storage box.
Figure 2:
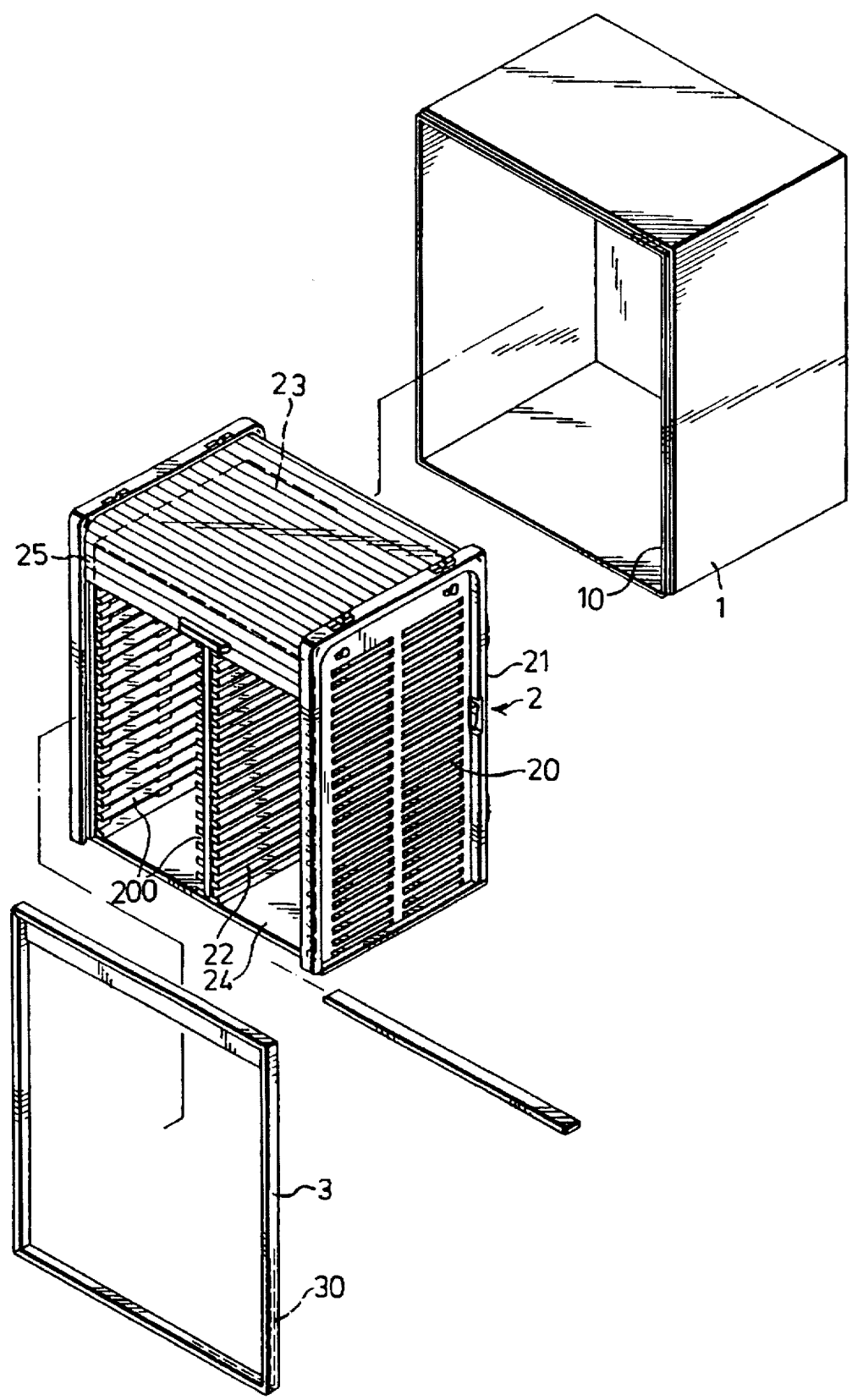
FIG. 2 is an exploded view of the conventional storage box.
Figure 3:
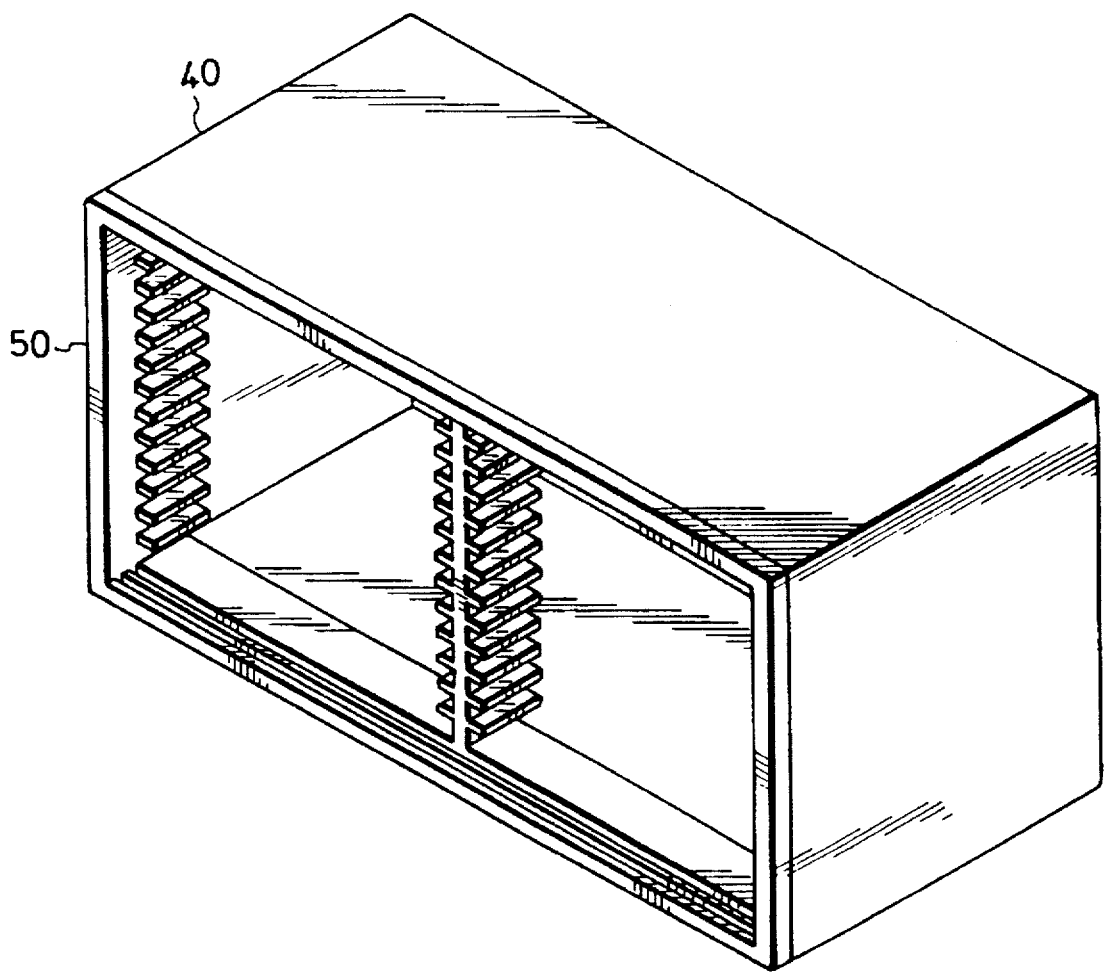
FIG. 3 is schematic view of a storage box of this invention.
Figure 4:
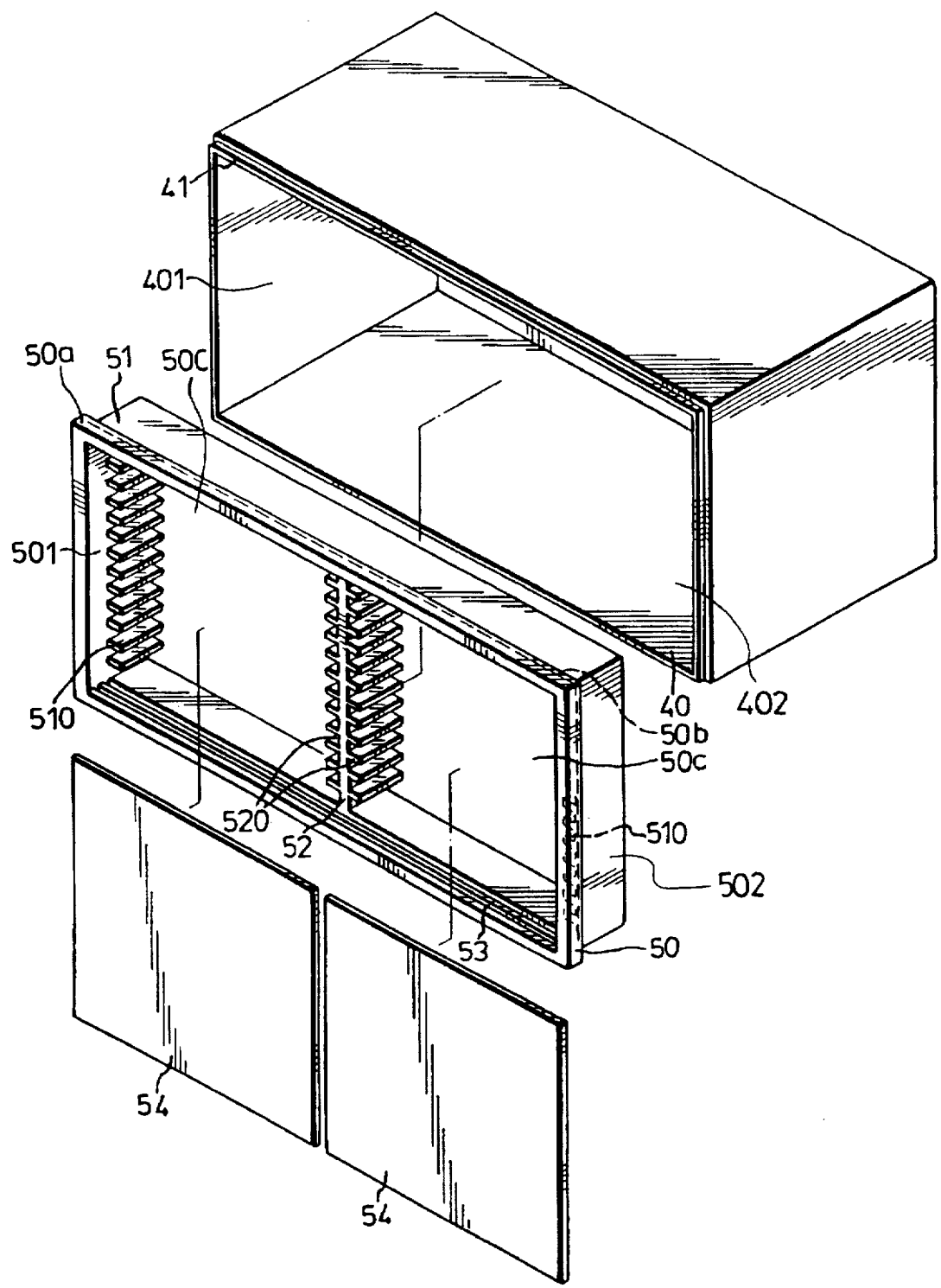
FIG. 4 is an exploded view of the preferred embodiment.

Referring to FIGS. 3 and 4, the preferred embodiment of a storage box for storing substantially flat articles is shown to include a rectangular casing 40, a one-piece rectangular frame unit 50, and two slide doors 54.

As illustrated, the casing 40 includes a pair of first upright lateral inner walls 401 opposite to each other, a substantially flat bottom wall 402 transversely interposed therebetween to define cooperatively a front open chamber with the inner walls 401, and an engagement extension 41 which projects frontwardly from a front edge of each of the first upright lateral inner walls 401.

The frame unit 50 includes a pair of second upright lateral inner surfaces 501, and a pair of second upright lateral outer surfaces 502 which define therebetween a width slightly greater than that of the first inner walls 401 so that the rear section 51 of the frame unit 50 can be press fitted into the chamber of the casing 40. A flange portion 50a is formed on a front edge of the second upright lateral outer surfaces 502 and has a rearward engaging groove 50b press fitted by the engagement extension 41 of the casing 40. Thus, the flange portion 50a abuts against the front edge of the first upright lateral inner walls 401 of the casing 40 to prevent further movement of the frame unit 50 during the press fit operation. A plurality of first parallel ribs 510 are transversely formed on each of the second upright lateral inner surfaces 501 so as to define a plurality of flat article receiving slots in the chamber. The frame unit 50 also includes an upright partition plate 52 disposed between the second lateral inner surfaces 501 to divide the frame unit 50 into two portions 50c. A plurality of second parallel ribs 520 are transversely formed on two opposite sides of the partition plate 52 to define a plurality of flat article receiving slots which are located on two sides of the partition plate 52.

The frame unit 50 has two pairs of longitudinal grooves 53 respectively formed in front portions thereof between the second lateral inner surfaces 501 to slidably receive the slide doors 54 so as to close and open the chamber.

Note that the lengths of each of the second lateral inner surfaces 501, as well as each of the first and second parallel ribs 510, 520, are shorter than one half of a length in a transverse direction of each of the upright inner walls 401.

The frame unit 50 can be separately formed, such as by means of an extrusion machine, and can be easily attached to the casing 40 by mere pressing. Misalignment of the ribs 510, 520 on the second lateral inner surface 501 and the partition plate 52 does not occur.

Figure 5:
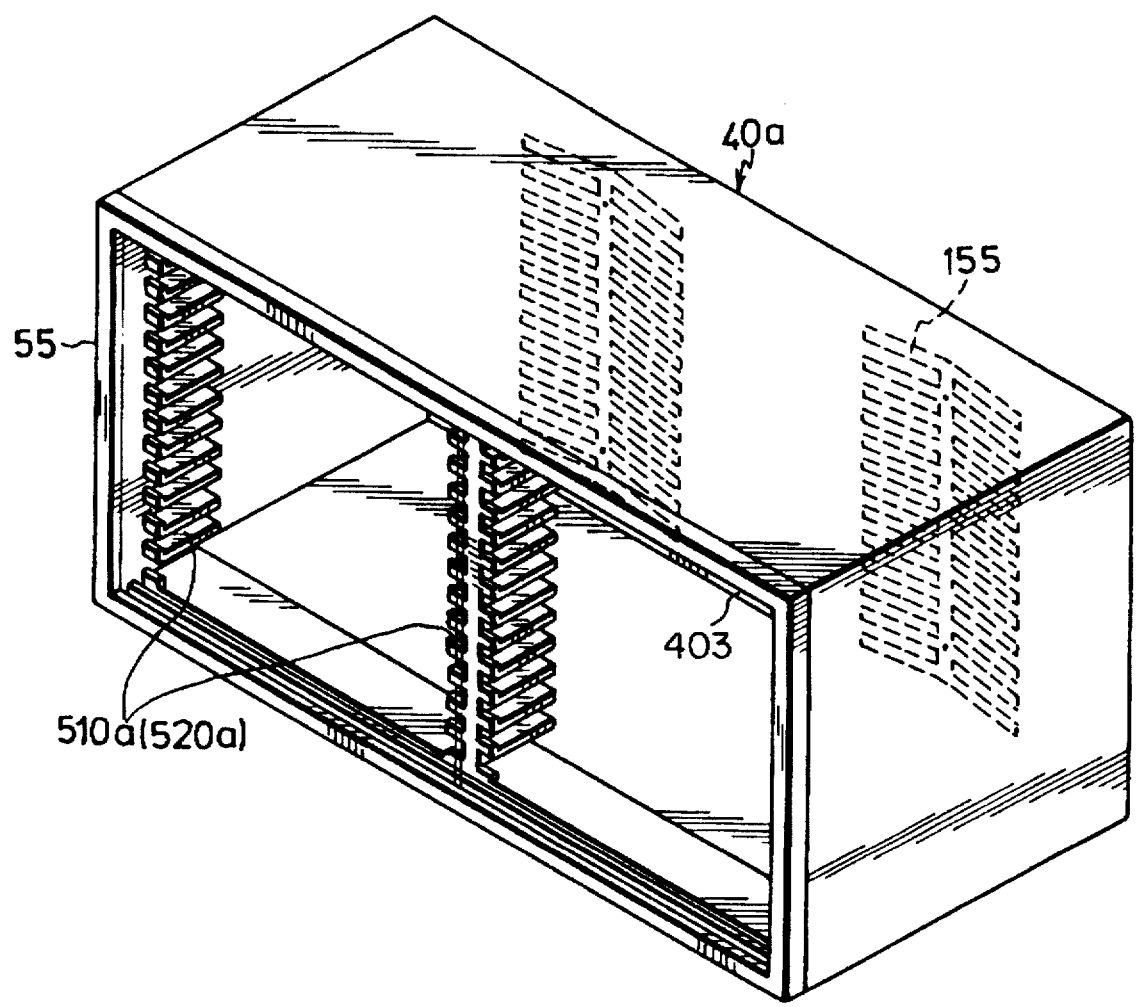
FIG. 5 is a perspective view of a modified storage box of this invention.

Referring to FIG. 5, a modified preferred embodiment is shown and has a structure generally similar to that of the previous embodiment except that each of the ribs 510a, 520a in the modified preferred embodiment is provided with an upwardly extending stop element 55 at a front end thereof for preventing a flat article from falling out of a corresponding one of the receiving slots after the flat article is disposed in the receiving slot. The rear wall 403 of the casing 40a is provided with a plurality of resilient studs 155 disposed on a rear wall thereof and generally corresponding to the slots so as to cushion an inserted flat article in order to prevent damage to a rear side of the flat article when the article is inserted into the receiving slot.

With this invention thus explained, it is obvious to those skilled in the art that various modifications and variations can be made without departing from the scope and spirit thereof. It is therefore intended that the invention be limited only as in the appended claims.

I claim:

1. A storage box for storing substantially flat articles, comprising:

a casing including a pair of first upright lateral inner walls opposite to each other, and a substantially flat bottom wall transversely interposed therebetween to define a front open chamber with said pair of inner walls; and a one-piece plastic frame unit including a pair of second upright lateral walls, each having an inner surface and an outer surface defining therebetween a width slightly larger than of said first inner walls such that the frame unit is press fitted into said chamber and extends into only a portion of the depth of the chamber; a flange portion disposed on a front edge of each of said outer surfaces of said second upright lateral walls for abutting against a front edge of each of said first upright lateral inner walls of said casing so as to prevent further movement of said frame unit into said chamber when press fitted; and a plurality of first parallel ribs transversely formed on each of said inner surfaces of said second upright lateral walls so as to define a plurality of flat article receiving slots in said chamber, said frame being open at a front and rear portion thereof wherein lengths of each of said inner surfaces of said second upright lateral walls as well as each of said first parallel ribs are shorter than one half of a length in a transverse direction of each of said first upright inner walls; and a plurality of resilient members mounted on a rear wall of said chamber so as to cushion insertion of an article into said chamber along slots formed between said first parallel ribs.

2. The storage box according to claim 1, wherein said flange portion of said plastic frame unit is formed with a rearward engaging groove, said casing including an engagement extension which projects frontwardly from said front edge of each of said first upright lateral inner walls so as to be engaged within said engaging groove.

3. The storage box according to claim 2, wherein said frame unit includes an upright partition plate disposed between inner surfaces of said upright lateral walls to divide said frame unit into two portions, and a plurality of second parallel ribs transversely formed on each of two opposite sides of said partition plate, said plurality of second parallel ribs on each side of said partition plate defining a plurality of flat article receiving slots.

4. The storage box according to claim 3, further comprising two slide doors, said frame unit having two pairs of longitudinal grooves respectively formed in front portions thereof between said inner surfaces of said upright lateral walls to slidably receive said two slide doors so as to close and open said chamber selectively.

5. The storage box according to claim 4, wherein each of said first and second ribs has an upwardly extending stop element formed at a front end thereof for preventing one of the flat article from falling out of a corresponding one of said receiving slots after the flat article is inserted in said receiving slot.

6. The storage box according to claim 5, wherein said casing further has a plurality of resilient studs disposed on a rear wall thereof and generally corresponding to said slots so as to cushion a rear side of the flat article.

* * * * *